United States Patent [19]
Kazirskis et al.

[11] Patent Number: 5,377,241
[45] Date of Patent: Dec. 27, 1994

[54] EFFLUENT CONTAINER

[75] Inventors: Benedict Kazirskis, Barto, Pa.; Edward W. Saxon, San Jose; Bettadapur N. Sridhar, Cupertino, both of Calif.

[73] Assignee: General Electric Company, San Jose, Calif.

[21] Appl. No.: 135,091

[22] Filed: Oct. 12, 1993

[51] Int. Cl.⁵ .............................................. G21C 19/04
[52] U.S. Cl. .................................... 376/272; 220/4.24
[58] Field of Search ........................... 376/272, 260; 250/506.1, 507.1; 220/4.21–4.25

[56] References Cited
U.S. PATENT DOCUMENTS

| | | |
|---|---|---|
| 4,633,708 | 1/1987 | Blommaert ........................ 220/4.24 |
| 5,169,593 | 12/1992 | Kazirskis et al. ..................... 376/260 |

Primary Examiner—Daniel D. Wasil
Attorney, Agent, or Firm—J. E. McGinness

[57] ABSTRACT

An effluent container has two halves which fit together to form a cylinder, open at the top, for catching residual contaminated water falling from the control rod drive (CRD) housing under the influence of gravity when the seal between the CRD housing and the CRD is broken. The container has an aperture which fits around the extension rod that supports the CRD when the mounting bolts are removed. The container halves are held together by elastic cords stretched between hooks on the side-walls. The effluent container has L-shaped slots which hook onto the bracing bolts of the sway brace system to support the container in position for catching falling water. Spilled water drains out of the container to a sump.

20 Claims, 6 Drawing Sheets

EFFLUENT CONTAINER

FIELD OF THE INVENTION

This invention relates generally to maintenance of a control rod drive of a boiling water reactor (BWR). Specifically, the invention relates to tools for dismantling or assembling a control rod drive during a maintenance operation.

BACKGROUND OF THE INVENTION

Figure 1:
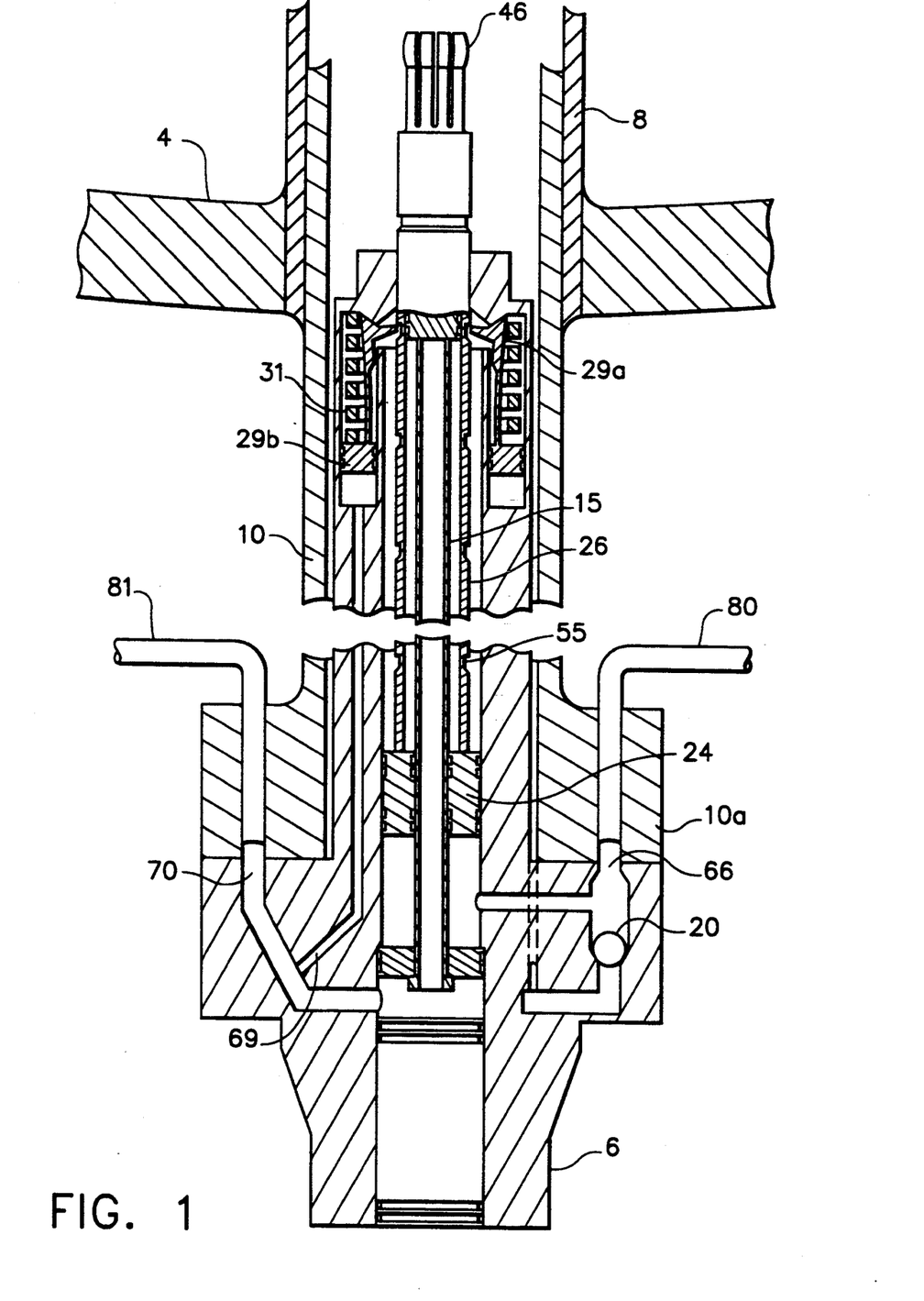
FIG. 1 is a sectional schematic of a conventional control rod drive installed in a BWR.

Control rod drives (CRDs) are used to position control rods in BWRs to control the fission rate and fission density, and to provide adequate excess negative reactivity to shutdown the reactor from any normal operating or accident condition at the most reactive time in core life. Referring to FIG. 1, each CRD is mounted vertically in a CRD housing 10 which is welded to a stub tube 8, which in turn is welded to the bottom head of the reactor pressure vessel 4 (RPV). The CRD flange 6 is bolted and sealed to the flange 10a of the CRD housing 10, which contains ports for attaching the CRD hydraulic system lines 80, 81. Demineralized water supplied by the CRD hydraulic system serves as the hydraulic fluid for CRD operation.

Figure 3:
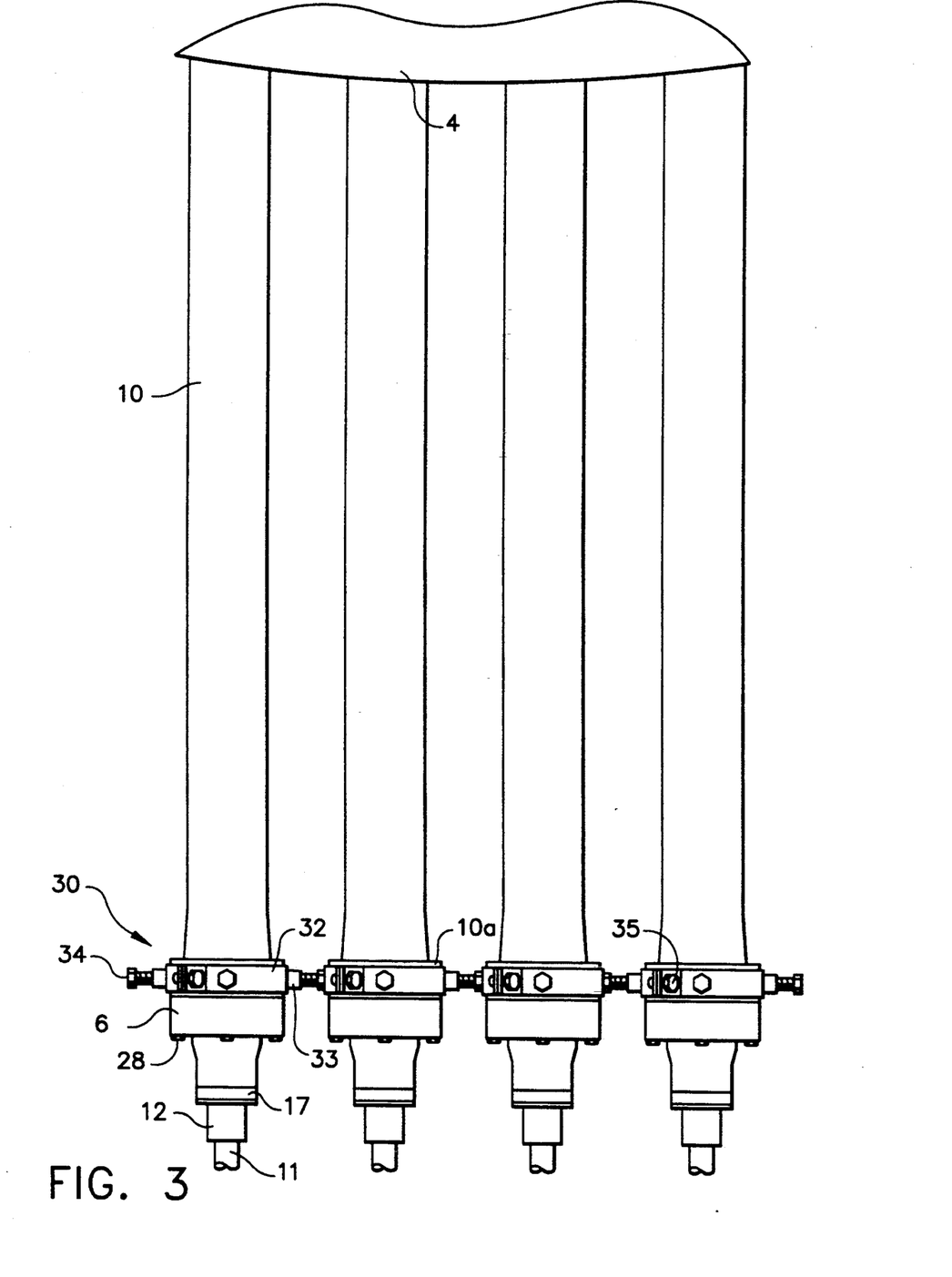
FIG. 3 is a plan view of a portion of the CRD array of a conventional BWR.

The flanges 10a of the CRD housings 10 extend below RPV 4 to the same elevation, as shown in FIG. 3. To prevent lateral oscillatory movement or swaying, e.g., during a seismic event, the CRD housings are restrained by a sway bracing system 30 comprising rings 32 and bracing bolts 34. Each ring consists of a pair of ring halves connected by bolts 35 to encircle the respective CRD housing flange 10a. Each ring has four or fewer nuts 33 welded thereon, each nut 33 having a threaded bore for receiving a bracing bolt 34. Each nut 33 extends radially outward from the ring 32 at any one of four positions circumferentially distributed at equal angular intervals around the installed ring. The radial position of the bracing bolts is adjusted by screwing or unscrewing until each CRD housing is braced on four sides by bracing bolts having a threaded end threadably coupled to a corresponding nut 33 and having a head which abuts the ring 32 on an adjacent CRD housing flange.

As shown in FIG. 1, the CRD is a double-acting, mechanically latched hydraulic cylinder. The CRD is capable of inserting or withdrawing a control rod (not shown) at a slow controlled rate for normal reactor operation and of providing rapid control rod insertion (scram) in the event of an emergency requiring rapid shutdown of the reactor. A locking mechanism in the CRD permits the control rod to be positioned at 6-inch increments of stroke and to be held in these latched positions until the CRD is actuated for movement to a new position. A spud 46 at the top of the index tube 26 (the moving element) engages and locks into a socket at the bottom of the control rod. Once coupled, the CRD and control rod form an integral unit which must be manually uncoupled by specific procedures before a CRD or control rod may be removed from the reactor.

When installed in the reactor, the CRD is wholly contained in housing 10. The CRD flange 6 contains an insert port 66, a withdraw port 70 and an integral two-way check valve (with a ball 20). For normal drive operation, drive water is supplied via an associated hydraulic control unit (HCU) to the insert port 66 for drive insertion and/or to withdraw port 70 for drive withdrawal. For rapid shutdown, reactor pressure is admitted to the two-way check valve from the annular space between the CRD and a thermal sleeve (not shown) through passages in the CRD flange, called scram vessel ports. The check valve directs reactor pressure or external hydraulic pressure to the underside of drive piston 24.

Figure 2:
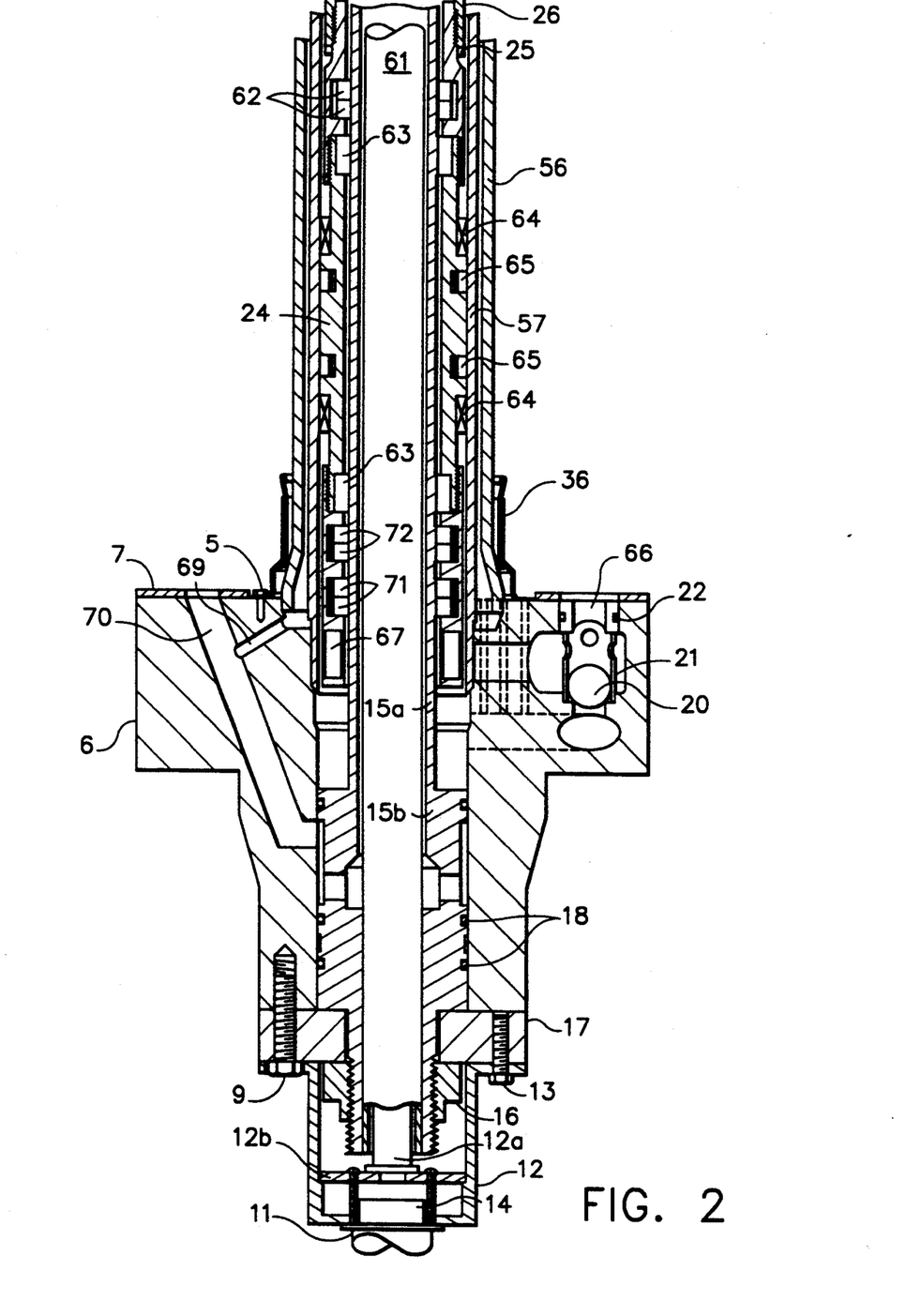
FIG. 2 is a sectional view of the lower portion of a conventional control rod drive.

Referring to FIGS. 1 and 2, the CRD comprises an inner cylinder 57 and an outer tube 56, which form an annulus through which water is applied to a collet piston 29b to unlock index tube 26. The internal diameter of the inner cylinder 57 is honed to provide the surface required for expanding seals 65 on the drive piston 24. A collet housing (part of outer tube 56) is provided with ports (not shown) to permit free passage of water from the clearance space between the outer diameter of index tube 26 and the inner diameter of inner cylinder 57 and the inner diameter of the collet housing.

Referring to FIG. 1, welded pipes 80 and 81, installed in the CRD housing, port water to the insert port 66 and the withdraw port 70 respectively. A port 69 below outer tube 56 connects to withdraw port 70 in CRD flange 6 so that water is applied through the annulus to collet piston 29b when a withdraw signal is given.

The CRD is secured to the CRD housing flange 10a by eight mounting bolts 28 (see FIG. 3). A pressure-tight seal is effected between the mated flanges by 0-ring gaskets (not shown) mounted in a spacer 7 secured to the CRD flange face.

Insert port 66 contains a ball check valve which consists of check-valve ball 20, ball retainer 21, and retainer 0-ring 22. This valve directs HCU accumulator pressure or reactor pressure to the underside of drive piston 24 during scram operation. Port 66 is connected internally to the annulus and the bottom of drive piston 24 and serves as the inlet for water during normal insertion or scram. Water enters this port for a brief period in response to a withdraw signal to move the index tube 26 upward so that collet fingers 29a are cammed out. After this brief unlocking period, water from below drive piston 24 is discharged through port 66 and through the under-piston hydraulic line for the duration of the withdraw signal.

The withdraw port 70 serves as the inlet port for water during control rod withdrawal and as the outlet port for water during normal or scram insertion. It connects with internal porting and annuli to the area above drive piston 24. During a withdraw operation, water is supplied from port 70 through a small connecting port 69 in CRD flange 6 to the annular space between outer tube 56 and inner cylinder 57 for application to the bottom of collet piston 29b.

The collet mechanism requires a hydraulic pressure greater than reactor pressure to unlock for CRD-withdraw movement. A preload is placed on collet spring 31 at assembly and must be overcome before the collet can be moved toward the unlocked position. For control rod withdrawal, a brief insert signal is applied to move index tube 26 upward to relieve the axial load on collet fingers 29a, camming them outward against the sloping lower surface of index tube locking notch 55. Immediately thereafter, withdraw pressure is applied. In addition to moving index tube 26 downward, this pressure is at the same time applied to the bottom of collet piston 29b to overcome the spring pressure and cam the fingers 29a outward against guide cap 39. When the withdraw signal ceases, the spring pressure forces the collet downward. As index tube 26 settles downward, collet fingers 29a snap into the next higher notch and lock. When collet fingers 29a engage a locking notch 55, collet piston 29b transfers the control rod weight from index tube 26 to the outer tube 56.

Unlocking is not required for CRD insertion. The collet fingers are cammed out of the locking notch as index tube 26 moves upward. The fingers 29a grip the outside wall of index tube 26 and snap into the next lower locking notch for single-notch insertion to hold index tube 26 in position. For scram insertion, index tube 26 moves continuously to its limit of travel during which the fingers snap into and cam out of each locking notch as index tube 26 moves upward. When the insert, withdraw or scram pressure are removed, index tube 26 settles back, from the limit of travel, and locks to hold the control rod in the required position.

The drive piston 24 and index tube 26 are the primary subassembly in the CRD, providing the driving link with the control rod as well as the notches for the locking mechanism collet fingers. Drive piston 24 operates between positive end stops, with a hydraulic cushion provided at the upper end only. Index tube 26 is a nitrided stainless-steel tube threaded internally at both ends. The spud 46 (see FIG. 1) is threaded to its upper end, while the head of the drive piston 24 is threaded to its lower end. The index tube-drive piston connection is secured by a band 25 with tab locks.

Drive piston 24 is provided with internal (62, 71, 72) and external seal rings (65), and is operated in the annular space between piston tube 15 and inner cylinder 57. Internal (63) and external (64) bushings prevent metal-to-metal contact between drive piston 24 and the surface of piston tube 15 and the wall of inner cylinder 57 respectively.

The magnet housing, which comprises the lower end of drive piston 24, contains a ring magnet 67 which actuates the switches of the position indicator probe (not shown) to provide remote electrical signals indicating control rod position.

The piston tube assembly forms the innermost cylindrical wall of the CRD. It is a welded unit consisting of piston tube 15 and a position indicator tube 61. The piston tube assembly provides three basic functions for CRD operation: (a) position indicator tube 61 is a pressure-containing part which forms a drywell housing for the position indicator probe 12a; (b) piston tube 15 provides for the porting of water to or from the upper end of the piston head portion of drive piston 24 during rod movement; and (c) during control rod scram insertion, buffer orifices 53 in piston tube 15 progressively shut off water flow to provide gradual deceleration of drive piston 24 and index tube 26.

The tube section 15a and head section 15b of piston tube 15 provide space for position indicator tube 61, which is welded to the lower interior of head section 15b and extends upward through the length of tube section 15a, terminating in a watertight cap near the upper end of the tube section. Piston tube 15 is secured by a nut 16 at the lower end of the CRD. Two horizontal ports are provided in the head section 15b, 180° apart, to transmit water between the withdraw porting in the CRD flange and the annulus between indicator tube 61 and tube section 15a of piston tube 15 for application to the top of drive piston 24. Three 0-ring seals 18 are installed around the head section 15b. Two seal the bottom of the CRD against water leakage and one seals the drive piston 24 under-piston pressure from the drive piston over-piston pressure.

The position indicator probe 12a, which is slidably inserted into indicator tube 61, transmits electrical signals to provide remote indications of control rod position and CRD operating temperature. Probe 12a is welded to a plate 12b, which plate is in turn bolted to housing 12. Housing 12 is secured to the CRD ring flange 17 by screws 13. A cable clamp 8, located at the bottom of a plug 14, secures a connecting electrical cable (not shown) to plug 14. Ring flange 17 is in turn secured to the CRD housing by screws 9. Thus, probe 12a, housing 12 and cable clamp 11 (with the cables passing therethrough) can be removed as a unit.

In order to perform maintenance on the CRD, the CRD is removed from the CRD housing. This is accomplished by first removing the connector 14, removing screws 13 and the probe assembly consisting of components 12, 12a and 12b, and then sliding the probe 12a out of the indicator tube 61. Prior to unscrewing the mounting bolts 28, an extension rod 84 (see FIG. 4) is installed with cylindrical portion 84a extending into the indicator tube and with shoulder 84b supporting the CRD inside the CRD housing. Then mounting bolts 28 are unscrewed to free the CRD from the CRD housing.

Figure 4:
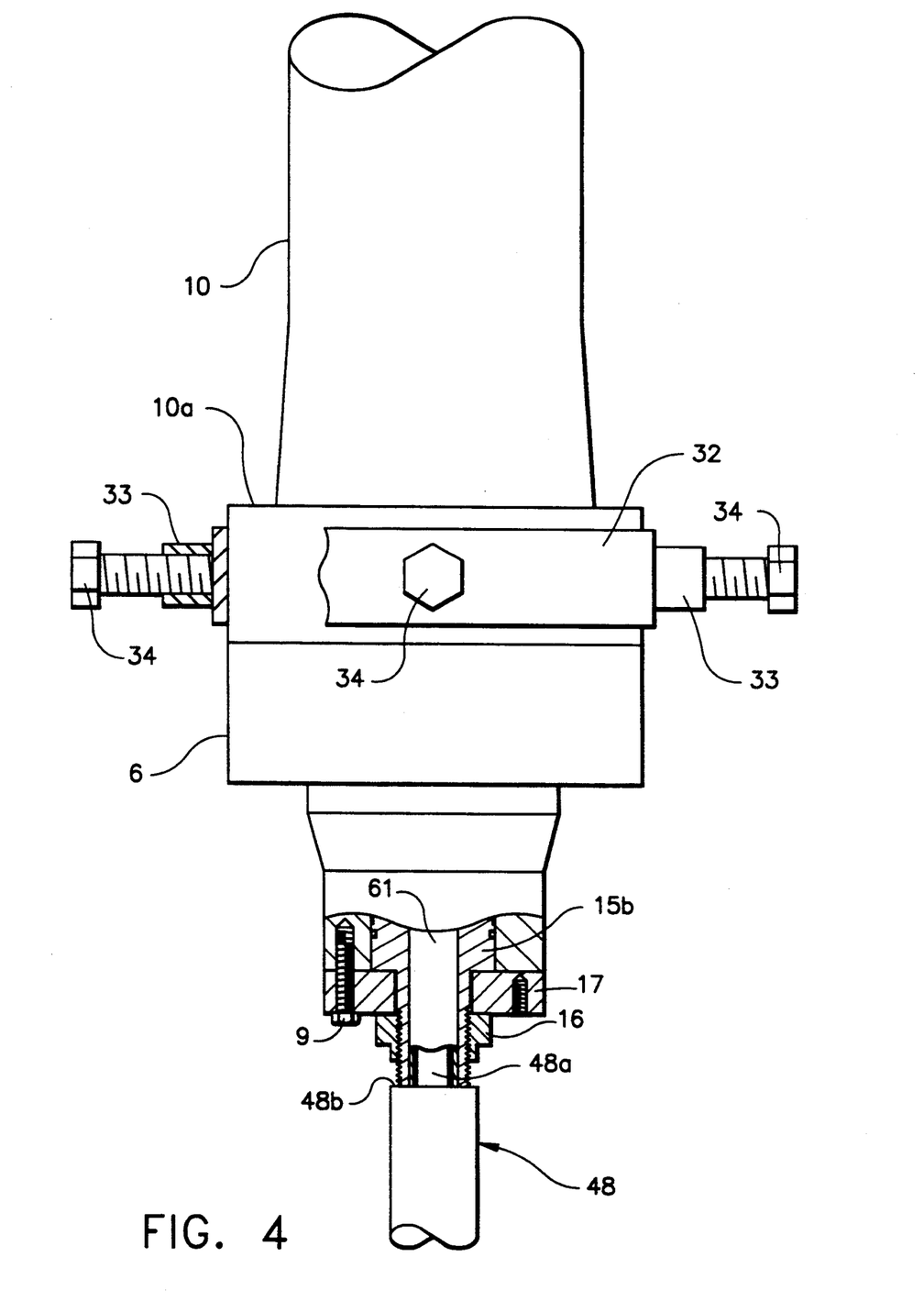
FIG. 4 is a plan view of a single installed CRD during the initial stage of the CRD removal operation, with the mounting bolts removed and a supporting extension rod in place.

When extension rod 84 is lowered, the CRD is likewise lowered, causing the seal between the CRD and the CRD housing to be broken. Upon breaking that seal, a small burst of effluent, i.e., residual water, spills from the CRD housing. If not contained, that spilling water, which is contaminated with radioactivity, falls upon a worker in the process of removing the CRD. Although workers wear protective clothing and breathing apparatus in this area, it is obviously undesirable to permit residual water to fall upon them or their workspace.

SUMMARY OF THE INVENTION

The present invention is an effluent container for catching a burst of effluent from the CRD housing when a CRD is disengaged therefrom at the start of CRD removal. The effluent container comprises two halves which fit together to form a generally circular cylindrical container for catching residual contaminated water falling from the CRD housing under the influence of gravity when the seal between the CRD housing and the CRD is broken. The container has an aperture which fits around the extension rod which serves to support the CRD when the bolts mounting the CRD on the CRD housing are removed. Each container half has hooking means, around which elastic means are stretched for holding the two halves together. The effluent container has L-shaped slots which hook onto the bracing bolts of the sway brace system to support the container in position for catching falling water. The effluent container further has drainage means for draining off the captured residual water to a sump.

DETAILED DESCRIPTION OF THE PREFERRED EMBODIMENTS

Figure 5:
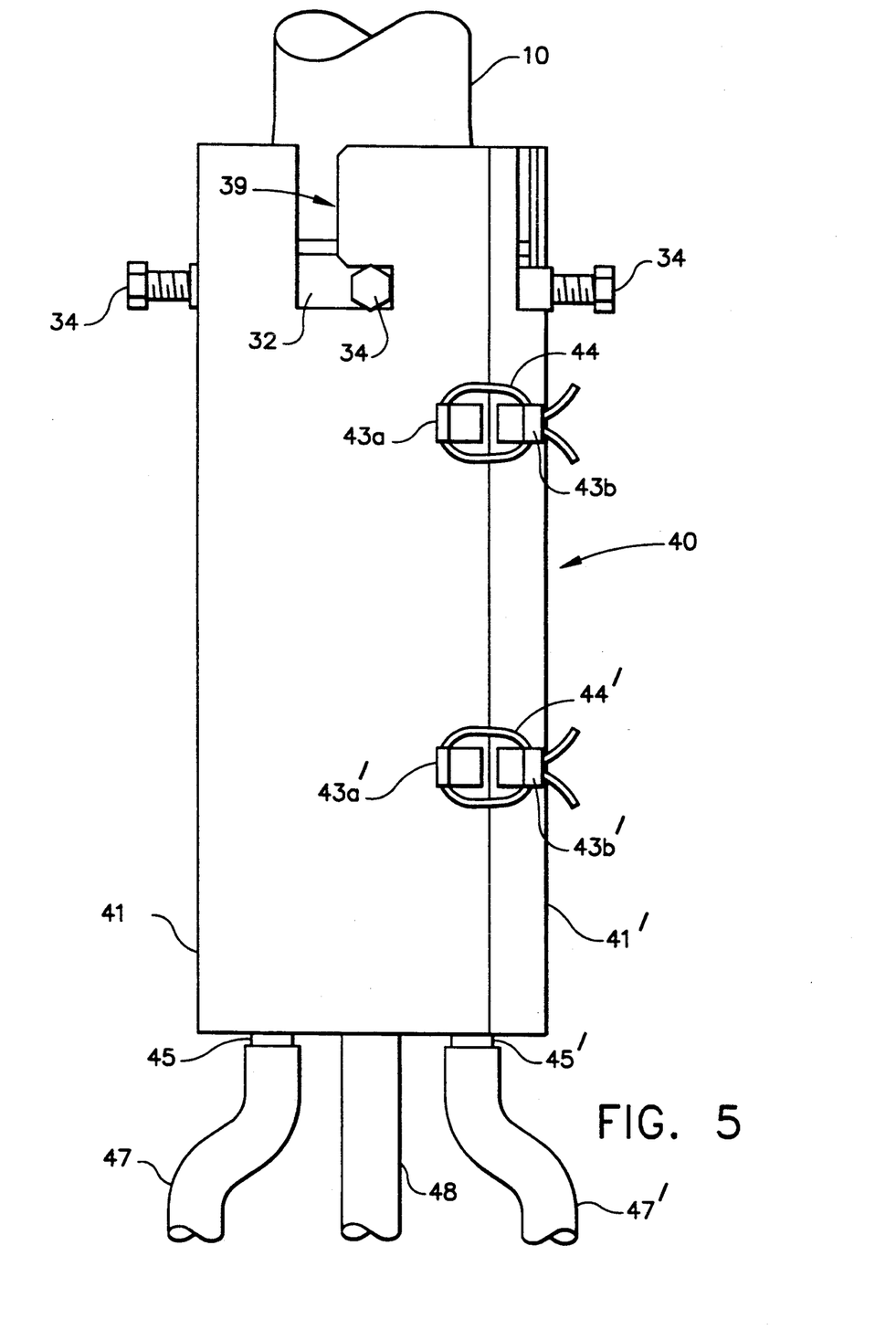
FIG. 5 is a plan view of an effluent container, in accordance with a preferred embodiment of the invention, installed on a CRD to be removed.

FIG. 5 shows an effluent container, in accordance with a preferred embodiment of the invention, installed in a CRD being supported by an extension rod 48 during the initial stages of CRD removal. The effluent container is positioned to catch any effluent water that escapes between flanges 6 and 10a (see FIG. 4) when the seal between them is broken.

The effluent container 40 consists of two halves which are strapped together by elastic cords 44, 44'. Each half comprises a half-cylindrical sidewall 41, 41' welded along its bottom edge to a half-circular base 42, 42' (see FIG. 6). The sidewalls 41, 41' meet along abutting straight edges. The fit between mating edges of the container halves is close enough to limit leakage therethrough to a very small amount. The base half 42 has a tongue which fits into an opposing groove in base half 42' to form an interlocking seam 50.

Figure 7:
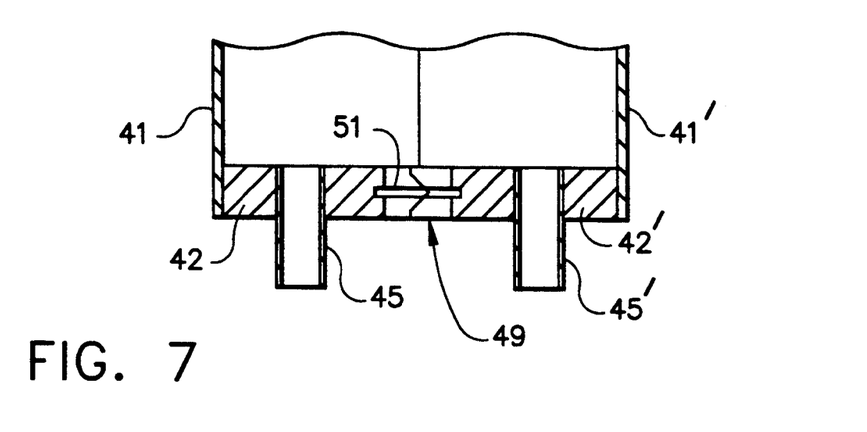
FIG. 7 is a sectional view taken along section 6—6 of the effluent container depicted in FIG. 5.

Referring to FIG. 7, each base half has a semicircular recess with an annular groove formed therein. When the base halves are fitted together, the semicircular recesses form a circular hole 49 which fits closely around the outer peripheral surface of extension rod 48, and the annular grooves form a seat 51 for an 0-ring (not shown). The 0-ring seals against leakage of residual water through the extension rod/effluent container interface.

Four L-shaped slots 39 are positioned along the upper edge of sidewalls 41, 41'and sized to slip over the threaded body of the four associated bracing bolts 34 during installation. The container is rotated about its axis through a small angle until the four bracing bolts 34 are seated at the tips of the bottom legs of the L-shaped slots 39, thereby hooking the effluent container 40 in the fully installed position.

A hole in base half 42 has a drainage nipple 45 seated therein which extends outside the effluent container. Likewise a drainage nipple 45' is seated in a hole in base half 42'. Each drainage nipple has a flexible hose 47, 47' coupled thereto which carries off any water that falls into and drains out of the effluent container. The hoses drain into a sump (not shown).

Figure 6:
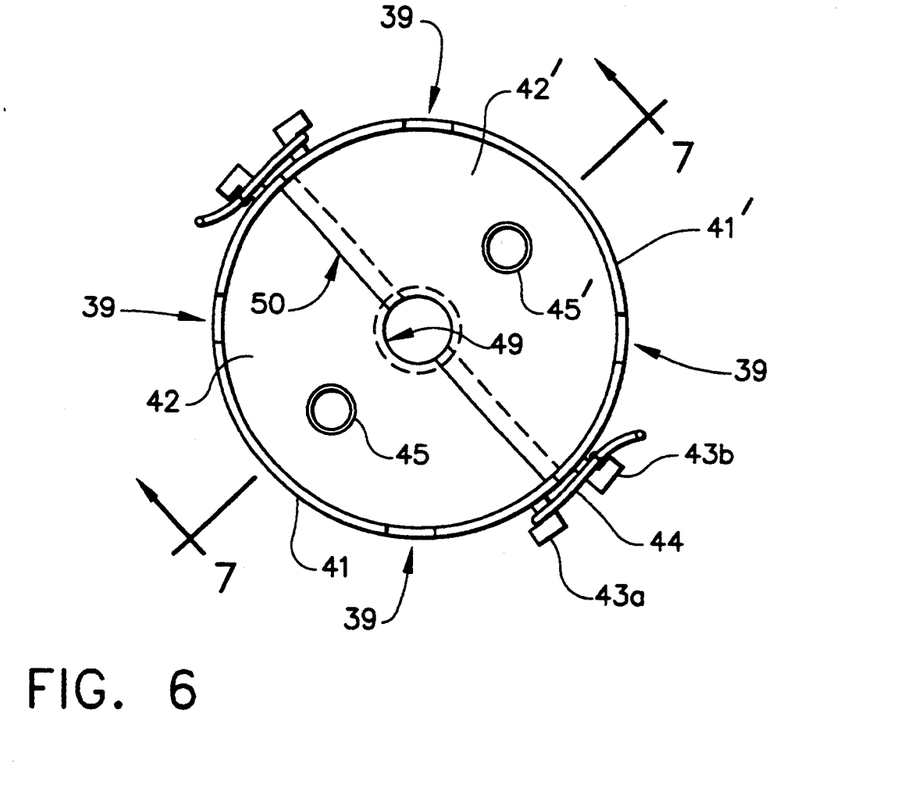
FIG. 6 is a top view of the effluent container in accordance with the preferred embodiment of the invention.

The two halves of the effluent container are held together on each side by a respective pair of elastic cords 44, 44' which are stretched around respective sets of hooking blocks 43a, 43b and 43a', 43b', which are attached to the side-walls, near the abutting side edges thereof, in mutually opposing relationship. The container can be easily and quickly assembled or disassembled by tensioning each cord and respectively looping or unlooping the tensioned cord from the hooking means.

During removal of the CRD from the CRD housing, mounting bolts 28 are removed while a strong upward force is exerted on the CRD through the extension rod 48. This prevents any substantial leakage during the initial stages of CRD removal. The effluent container 40 is assembled so that the extension rod 48 passes through central hole 49 and then hung onto the sway braces.

The extension rod is then lowered slightly to break the seal between flanges 6 and 10a. This permits liquid effluent to drain into container 40 and thence through to a location where it can be controlled. After all of the effluent has been drained off, the container can be disassembled and the CRD can be lowered still further as desired.

The effluent container may be made of any suitable material. We have discovered that a plastic resin, and especially a clear acrylic resin, has suitable properties of lightness, strength and resilience for this purpose. The use of a transparent material provides the important benefit of permitting a worker to see the flow of water inside, and to determine when substantially all of the water flow has been captured.

The preferred embodiment of the effluent container has been disclosed for the purpose of illustration. Variations and modifications of the disclosed structure which do not depart from the concept of this invention will be readily apparent to mechanical engineers skilled in the art. All such variations and modifications are intended to be encompassed by the claims set forth hereinafter.

We claim:

1. A container comprising first and second container halves, said first container half comprising a first semi-cylindrical side-wall and a first semi-circular base half joined along its semi-circular periphery to an inner surface of said first semi-cylindrical side-wall, and said second container half comprising a second semi-cylindrical side-wall and a second semi-circular base half joined along its semi-circular periphery to an inner surface of said second semi-cylindrical side-wall, said first and second container halves fitting together to form a generally circular cylindrical container with abutting base halves and abutting side-walls, said abutting first and second base halves forming a base, each of said first and second semi-circular base halves having a semi-circular cutout, said cutouts forming a circular central hole in said base, further comprising first and second means for holding said first and second container halves together, wherein said first holding means comprises a first elastic cord and said second holding means comprises a second elastic cord.

2. The container as defined in claim 1, wherein each of said first and second holding means further comprises a pair of hooks respectively connected to said first and second semi-cylindrical side-walls, said first elastic cord being looped in a tensioned state around said hooks of said first holding means and said second elastic cord being looped in a tensioned state around said hooks of said second holding means.

3. The container as defined in claim 2, wherein each of said semi-cylindrical side walls has an arcuate top edge and an L-shaped slot extending from said top edge.

4. The container as defined in claim 2, wherein each of said circular cutouts has an arcuate groove formed therein, said arcuate grooves forming an annular seat in said central hole of said base.

5. The container as defined in claim 2, wherein at least one of said first and second base halves has drainage means formed therein.

6. The container as defined in claim 5, wherein said drainage means is a drainage hole, further comprising a drainage nipple seated inside said drainage hole and extending below said base.

7. The container as defined in claim 2, wherein said first and second base halves abut in a tongue-in-groove arrangement.

8. The container as defined in claim 2, wherein said first and second semi-cylindrical side-walls are made of a plastic material.

9. The container as defined in claim 8, wherein said plastic material is transparent.

10. An effluent container for capturing effluent spilled when the seal between a control rod drive and a control rod drive housing is broken while said control rod drive is supported by an extension rod, comprising first and second container halves, said first container half comprising a first semi-cylindrical side-wall and a first semi-circular base half joined along its semi-circular periphery to an inner surface of said first semi-cylindrical side-wall, and said second container half comprising a second semi-cylindrical side-wall and a second semi-circular base half joined along its semi-circular periphery to an inner surface of said second semi-cylindrical side-wall, said first and second container halves fitting together to form a generally circular cylindrical container with abutting base halves and abutting side-walls, said abutting first and second base halves forming a base, each of said first and second semi-circular base halves having a cutout, said cutouts being shaped to form a central hole in said base, said central hole having a shape which conforms to the cross-sectional shape of said extension rod, further comprising first and second means for holding said first and second container halves together, wherein said first holding means comprises a first elastic cord and said second holding means comprises a second elastic cord.

11. The container as defined in claim 10, wherein each of said first and second holding means further comprises a pair of hooks respectively connected to said first and second semi-cylindrical side-walls, said first elastic cord being looped in a tensioned state around said hooks of said first holding means and said second elastic cord being looped in a tensioned state around said hooks of said second holding means.

12. The container as defined in claim 10, wherein each of said semi-cylindrical side walls has an arcuate top edge and an L-shaped slot extending from said top edge.

13. The container as defined in claim 12, wherein each of said cutouts is circular and has an arcuate groove formed therein, said arcuate grooves forming an annular seat in said central hole of said base.

14. The container as defined in claim 12, wherein at least one of said first and second base halves has drainage means formed therein.

15. The container as defined in claim 14, wherein said drainage means is a drainage hole, further comprising a drainage nipple seated inside said drainage hole and extending below said base.

16. The container as defined in claim 12, wherein said first and second base halves abut in a tongue-in-groove arrangement.

17. The container as defined in claim 12, wherein said first and second semi-cylindrical side-walls are made of a plastic material.

18. The container as defined in claim 17, wherein said plastic material is transparent.

19. An effluent container for capturing effluent spilled when the seal between a control rod drive and a control rod drive housing is broken while said control rod drive is supported by an extension rod, comprising first and second container halves, said first container half comprising a first semi-cylindrical side-wall and a first semi-circular base half joined along its semi-circular periphery to an inner surface of said first semi-cylindrical side-wall, and said second container half comprising a second semi-cylindrical side-wall and a second semi-circular base half joined along its semi-circular periphery to an inner surface of said second semi-cylindrical side-wall, said first and second container halves fitting together to form a generally circular cylindrical container with abutting base halves and abutting side-walls, said abutting first and second base halves forming a base, each of said first and second semi-circular base halves having a cutout, said cutouts being shaped to form a central hole in said base, said central hole having a shape which conforms to the cross-sectional shape of said extension rod, further comprising first through fourth elastic means for holding said first and second container halves together, and first through fourth pairs of members for supporting said first through fourth elastic means respectively, each pair of said members comprising a first member connected to said first semi-cylindrical side-wall and a second member connected to said second semi-cylindrical side-wall.

20. The container as defined in claim 19, wherein each of said first through fourth elastic means comprises an elastic cord and each of said members comprises a hook, each of said elastic cords being looped in a tensioned state around a corresponding pair of said hooks.

* * * * *